US012619185B2

(12) United States Patent
Kawakita

(10) Patent No.: US 12,619,185 B2
(45) Date of Patent: May 5, 2026

(54) SHEET FEEDING APPARATUS AND IMAGE FORMING APPARATUS

(71) Applicant: CANON KABUSHIKI KAISHA, Tokyo (JP)

(72) Inventor: Akihiro Kawakita, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/980,514

(22) Filed: Dec. 13, 2024

(65) Prior Publication Data

US 2025/0251689 A1 Aug. 7, 2025

(30) Foreign Application Priority Data

Feb. 2, 2024 (JP) ................................. 2024-014648

(51) Int. Cl.
*G03G 15/00* (2006.01)
*G03G 21/16* (2006.01)

(52) U.S. Cl.
CPC ......... *G03G 15/6511* (2013.01); *G03G 15/50* (2013.01); *G03G 15/6558* (2013.01); *G03G 21/1638* (2013.01)

(58) Field of Classification Search
None
See application file for complete search history.

(56) References Cited

U.S. PATENT DOCUMENTS

| | | | | |
|---|---|---|---|---|
| 5,908,188 A | 6/1999 | Katamoto et al. | | |
| 2023/0322509 A1* | 10/2023 | Ando | ........................ | B65H 3/48 271/90 |
| 2024/0300762 A1* | 9/2024 | Inoue | ........................ | B65H 7/16 |

FOREIGN PATENT DOCUMENTS

| | | |
|---|---|---|
| JP | H0423747 A | 1/1992 |
| JP | H08179573 A | 7/1996 |

* cited by examiner

*Primary Examiner* — Leslie J Evanisko
(74) *Attorney, Agent, or Firm* — ROSSI, KIMMS & McDOWELL LLP

(57) ABSTRACT

A sheet feeding apparatus and an image forming apparatus including: an air blowing portion configured to blow air to sheets stacked on a sheet stacking member; a feeding portion configured to feed the sheets stacked on the sheet stacking member; a conveying path through which the sheets fed by the feeding portion pass; a first opening and closing member configured to be openable and closable such that first opening and closing member takes a closed state in which the first opening and closing member forms the conveying path through which the sheets pass and an opened state in which the first opening and closing member is opened for removing a stagnating sheet on the conveying path; and a controller configured to stop air blowing by the air blowing portion in response to the opened state of the first opening and closing member while the air blowing portion blows air.

9 Claims, 11 Drawing Sheets

SHEET FEEDING APPARATUS AND IMAGE FORMING APPARATUS

BACKGROUND OF THE INVENTION

Field of the Invention

This invention relates to a sheet feeding apparatus and an image forming apparatus provided with an air blowing function to blow air for loosening stacked sheets.

Description of the Related Art

In an image forming apparatus such as a copying machine, a facsimile and a printer, and in an image forming system provided with such an image forming apparatus, a sheet feeding apparatus is provided such as a feeding cassette, a feeding deck and a manual feeding portion on which a bundle of sheets to be fed to an image forming portion is set.

Recently, demands for forming images on various kinds of sheets are increasing. For example, a sheet with smooth surface characteristics such as coated sheets may be used as a recording material. When a bundle of such smooth surface sheets is set on the sheet feeding apparatus, the sheet feeding may be accompanied with difficulty because of the high adhesive force between sheets. In view of this background, Japanese Patent Application Laid-open No. H04-23747 discloses the technology in which air is blown to a bundle of sheets to blow them so that the sheets can by fed while being loosened.

In the following, a general control process of feeding sheets while the sheets are loosened by blowing air to the bundle of sheets as disclosed in Japanese Patent Application Laid-open No. H04-23747 will be described using a flowchart of FIG. 10.

As shown in FIG. 10, when the control process for the sheet feeding has started according to an instruction of print job start, for example, the operation of blowing air to the bundle of sheets starts (step S101) and the operation of blowing air continues until a predetermined time period of 10 seconds elapses from the start of the air blowing (step S102). This predetermined time period is the one necessary for decreasing adhesiveness between the sheets by blowing air to loosen sheets. This predetermined time period is not intended to limit to the constant time period of 10 seconds across the board and can be variable.

When the predetermined time period has elapsed from the start of the air blowing, the operation of feeding sheets to the image forming portion with a pickup roller and so on starts (step S103). Then, the feeding operation is repeated until the number of sheets fed to the image forming portion according to the instruction of print job reaches the necessary value (step S104). When the number of sheets fed to the image forming portion has reached the necessary value, the operation of blowing air stops (step S105), which completes this control process.

By the way, a door of the image forming apparatus may be opened by a user during the operation of blowing air. In such a case, the print job stops, but there is a problem that electric power is consumed wastefully when keeping a fan for blowing air driven.

SUMMARY OF THE INVENTION

The object of the present invention is to provide a sheet feeding apparatus and an image forming apparatus which can prevent itself from consuming wastefully the electric power when the door of the image forming apparatus is opened during the operation of blowing air for loosening the sheets.

An aspect of the present invention is a sheet feeding apparatus comprising:

- a sheet stacking member in which sheets are stacked;
- an air blowing portion configured to blow air to the sheets stacked on the sheet stacking member;
- a feeding portion configured to feed the sheets stacked on the sheet stacking member;
- a conveying path through which the sheets fed by the feeding portion pass;
- a first opening and closing member configured to be openable and closable such that the first opening and closing member takes a closed state in which the first opening and closing member forms the conveying path through which the sheets pass and an opened state in which the first opening and closing member is opened for removing a stagnating sheet on the conveying path;
- a first opening and closing detection portion configured to detect the closed state and the opened state of the first opening and closing member; and
- a controller configured to stop air blowing by the air blowing portion in response to the first opening and closing detection portion detecting the opened state of the first opening and closing member while the air blowing portion blows air.

Further features of the present invention will become apparent from the following description of exemplary embodiments with reference to the attached drawings.

DESCRIPTION OF THE EMBODIMENTS

Hereinafter, with reference to the drawings, preferred embodiments of the present invention will be described in detail. The components in the following embodiments are just examples and the configuration, the function, and the various conditions such as dimensions, materials, shape and relative positions of the apparatus to which the present invention is applied can be modified or altered as appropriate without departing from the gist of the present invention, so that the invention is not limited to the following embodiments.

Figure 1:
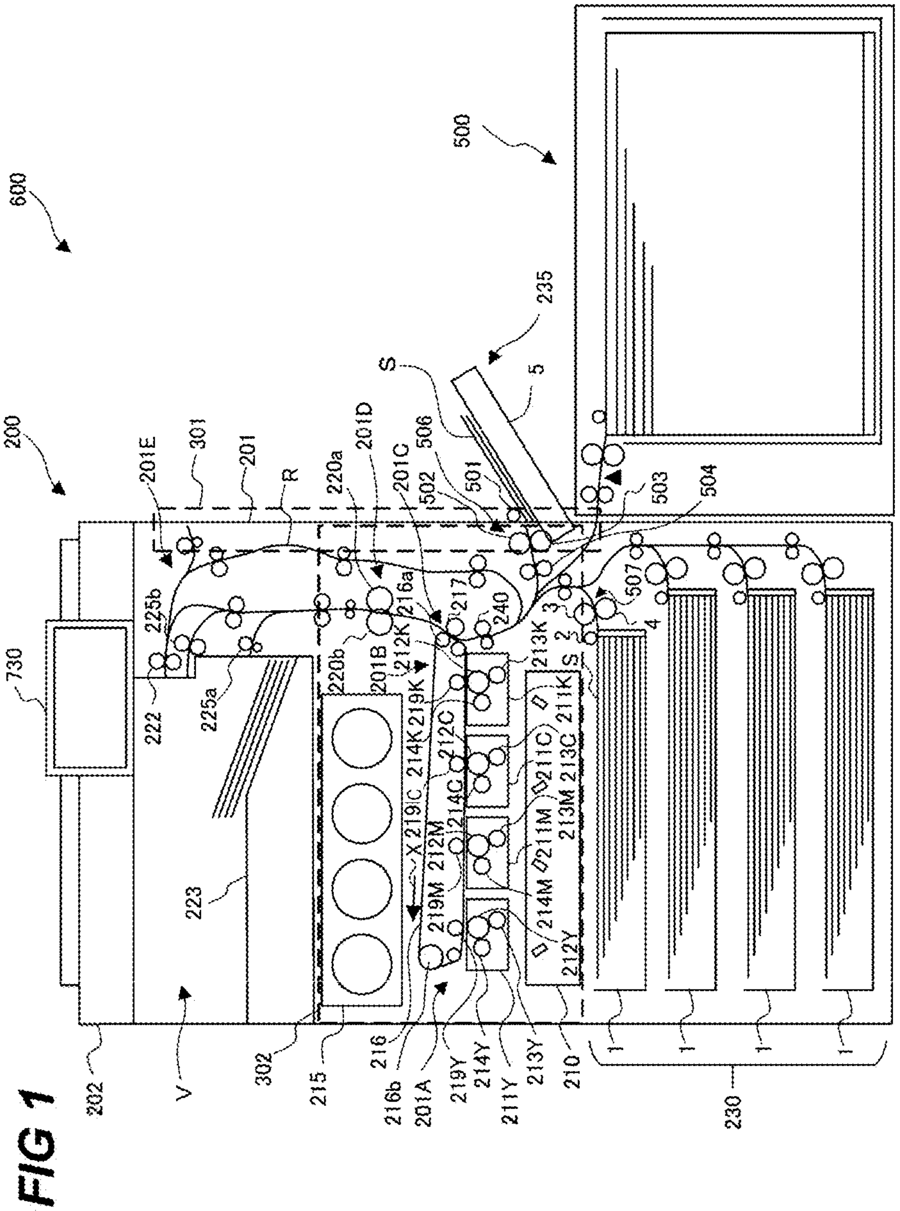
FIG. 1 is a schematic diagram showing a front cross-sectional view of an image forming system according to an embodiment of the present invention.

FIG. 1 is a schematic diagram showing a front cross-sectional view of the image forming system according to an embodiment of the present invention.

As shown in FIG. 1, the image forming system 600 is provided with the image forming apparatus 200 and the feeding deck 500 connected to the image forming apparatus 200. The feeding deck 500 as a sheet feeding apparatus is connected to the right side of the image forming apparatus 200 in FIG. 1 and is configured to be able to feed the sheet S to the image forming apparatus 200.

In FIG. 1, the reference character 201 denotes the main body of the image forming apparatus and the reference character 201A denotes an image forming portion that forms an image on a sheet. The reference character 202 denotes an image reading apparatus installed horizontally on the image forming apparatus main body 201. Between the image reading apparatus 202 and the image forming apparatus main body 201, the discharge space V for discharging sheets is formed.

Further, the operation portion 730 constituted by a touch panel on which an image screen can be displayed is provided on the image forming apparatus main body 201.

The image forming portion 201A as an image forming unit is of a four-drum full-color system. The image forming portion 201A is provided with the laser scanner 210 and the four process cartridges 211Y, 211M, 211C, and 211K that form four-color toner images of yellow (Y), magenta (M), cyan (C) and black (K). The process cartridges 211Y, 211M, 211C and 211K respectively includes the photosensitive drums 212Y, 212M, 212C and 212K, the charging devices 213Y, 213M, 213C and 213K as charging portions, and the developing devices 214Y, 214M, 214C and 214K as developing units. Further, the image forming portion 201A is provided with the intermediate transfer unit 201B disposed above the process cartridges 211Y, 211M, 211C and 211K, and the fixing portion 201D. The toner cartridge 215 supplies toner to the developing devices 214Y, 214M, 214C and 214K.

In the intermediate transfer unit 201B, the intermediate transfer belt 216 that is wounded around the driving roller 216*a* and the tension roller 216*b*. Inside the intermediate transfer belt 216, provided are the primary transfer rollers 219Y, 219M, 219C and 219K that abut on the intermediate transfer belt 216 at the positions in which the primary transfer rollers 219Y, 219M, 219C and 219K are respectively opposed to the photosensitive drums 212Y, 212M, 212C and 212K. The intermediate transfer belt 216 is rotated in the direction indicated by the arrow X by the driving roller 216*a* that is driven by a driving portion (not shown).

The toner image of each color having a negative polarity on the photosensitive drum is transferred in a sequential and multiple manner on the intermediate transfer belt 216 by the respective primary transfer roller 219Y, 219M, 291C, 291K. In the position that is opposed to the driving roller 216*a* of the intermediate transfer unit 201B, the secondary transfer roller 217 for transferring the color image formed on the intermediate transfer belt to the sheet S is provided. The secondary transfer portion 201C is configured by the intermediate transfer belt 216 and the secondary transfer roller 217. Above the secondary transfer roller 217, the fixing portion 201D is disposed that has the pressure roller 220*a* and the heating roller 220*b*. On the left side above the fixing portion 201D, the first discharge roller 225*a*, the second discharge roller 225*b* and the surface reversing portion 201E are disposed. In the surface reversing portion 201E, the reverse roller pair 222 that can be rotated both in the forward and backward directions and the re-conveying path R that conveys to the image forming portion 201A again the sheet in one surface of which an image is formed are provided.

In the lower portion of the image forming apparatus main body 201, the sheet feeding unit 230 is provided that feeds the sheets S set in the sheet feeding unit 230 towards the image forming portion 201A. The sheet feeding unit 230 includes the feeding cassette 1 that accommodates sheets S and the sheet feeding portion 507 that feeds the sheets S accommodated in the feeding cassette 1. The sheet feeding portion 507 as a sheet feeding device is provided with the pickup roller 2, the feed roller 3 and the retard roller 4 as a separating unit that separates multi-fed sheets S that are fed out from the pickup roller 2.

On the right-side surface of the image forming apparatus main body 201 in FIG. 1, the manual feeding apparatus 235 as a sheet feeding apparatus is provided that feeds the manually fed sheets S to the image forming portion 201A. The manual feeding apparatus 235 is provided with the manual feed tray 5 as a sheet stacking member on which the sheets S are stacked. The manual feeding apparatus 235 is also provided with the manual sheet feeding portion 506 as a feeding portion configured by the pickup roller 501, the feed roller 502 and retard roller 503 that separate the sheets S sent out from the pickup roller 501 like the sheet feeding unit 230.

Further, on the right-side surface of the image forming apparatus main body 201 in FIG. 1 below the manual feeding apparatus 235, the feeding deck 500 is provided that feeds the set sheets S towards the image forming portion 201A. The manual feeding apparatus 235 will be described in detail later.

Next, the image forming operation of the image forming apparatus 200 will be described. First, when the image information of a document is read by the image reading apparatus 202, the image information is subjected to the image processing, converted into an electric signal, and transmitted to the laser scanner 210 of the image forming portion 201A. In the image forming portion 201A, the surfaces of the photosensitive drums 212Y, 212M, 212C and 212K are uniformly charged by the charging devices 213Y, 213M. 213C and 213K to the predetermined polarity and potential and the surfaces of the photosensitive drums 212Y, 212M, 212C and 212K are sequentially exposed with a laser beam. As a result, electrostatic latent images of yellow, magenta, cyan and black are sequentially formed on the photosensitive drums 212Y, 212M, 212C and 212K of the process cartridges 211Y, 211M, 211C and 211K, respectively.

After that, the electrostatic latent images are developed into visible images with toners of respective colors by the developing devices 214Y, 214M, 214C and 214K. The toner images for respective colors on the photosensitive drums 212Y, 212M, 212C and 212K are sequentially transferred onto the intermediate transfer belt 216 in a superimposing manner by primary transfer biases applied to the primary transfer rollers 219Y, 219M, 219C and 219K. As a result, a color toner image is formed on the intermediate transfer belt 216.

Meanwhile, the sheet S fed by the feed roller 3 of the sheet feeding unit 230 is conveyed to the registration roller pair 240 configured by a driving roller and a driven roller. At this time, the driving of the registration roller pair 240 is stopped and the tip portion of the sheet S is abutted on the registration roller pair 240 so that the tip portion of the sheet S is followed by the registration roller pair 240. After that, a loop (deflection) is formed on the sheet S while the feed roller 3 keeps conveying the sheet S. When a predetermined amount of loop is formed, the registration roller pair 240 is driven so that the skew feeding of the sheet S is corrected by the registration roller pair 240 and the sheet S whose skew feeding has corrected is conveyed to the secondary transfer portion 201C by the registration roller pair 240.

Subsequently, in the secondary transfer portion 201C, the toner images are transferred onto the sheet S in a batch by the secondary transfer bias applied to the secondary transfer roller 217. Then, the sheet S on which the toner images have been transferred is conveyed to the fixing portion 201D where the toners of the respective colors on the sheet S are fused and color-mixed by receiving heat and pressure so that the corresponding color image is fixed on the sheet S.

After that, the sheet S on which the image has been fixed is discharged to the discharge space V by the first discharge roller pair 225*a* and the second discharge roller pair 225*b* provided downstream of the fixing portion 201D to be accumulated on the accumulating portion 223 formed on the bottom surface of the discharge space V.

where images should be formed on both surfaces of the sheet S, after the image on the first surface has been fixed, the sheet S is conveyed to the re-conveying path R by the reverse roller pair 222 so that the sheet S is conveyed to the image forming portion 201A again.

Figure 2:
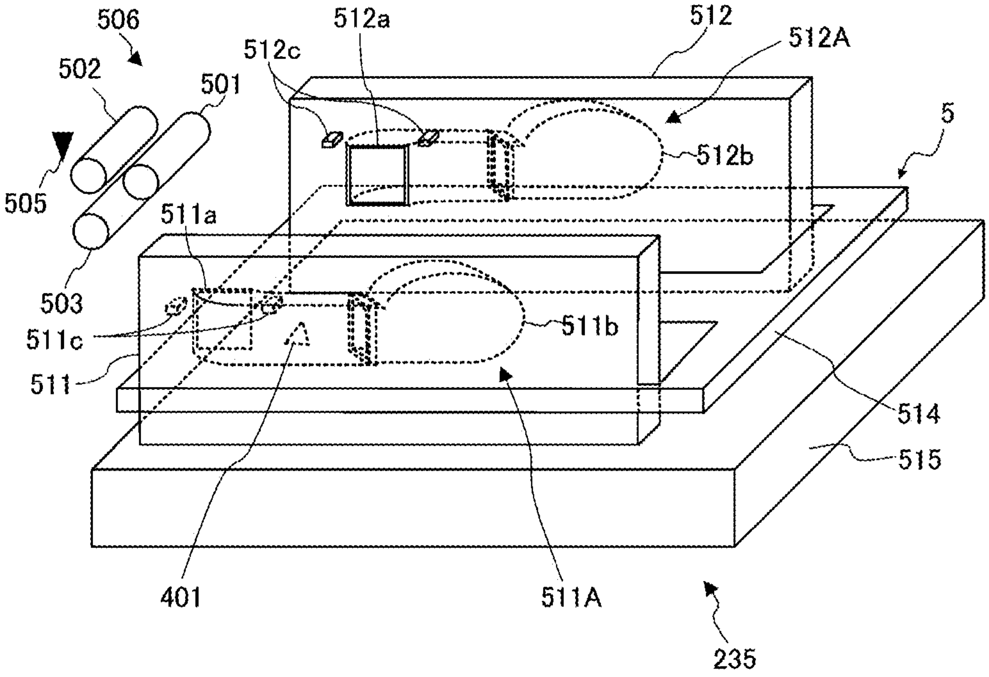
FIG. 2 is a diagram showing a perspective view of the configuration of a manual feeding apparatus according to the embodiment of the present invention.

Next, the details of the manual feeding apparatus 235 will be described with reference to FIGS. 2 and 3. FIG. 2 is a diagram showing a perspective view of the manual feeding apparatus 235 and FIG. 3 is a diagram showing a side view of the manual feeding apparatus 235.

Figure 3:
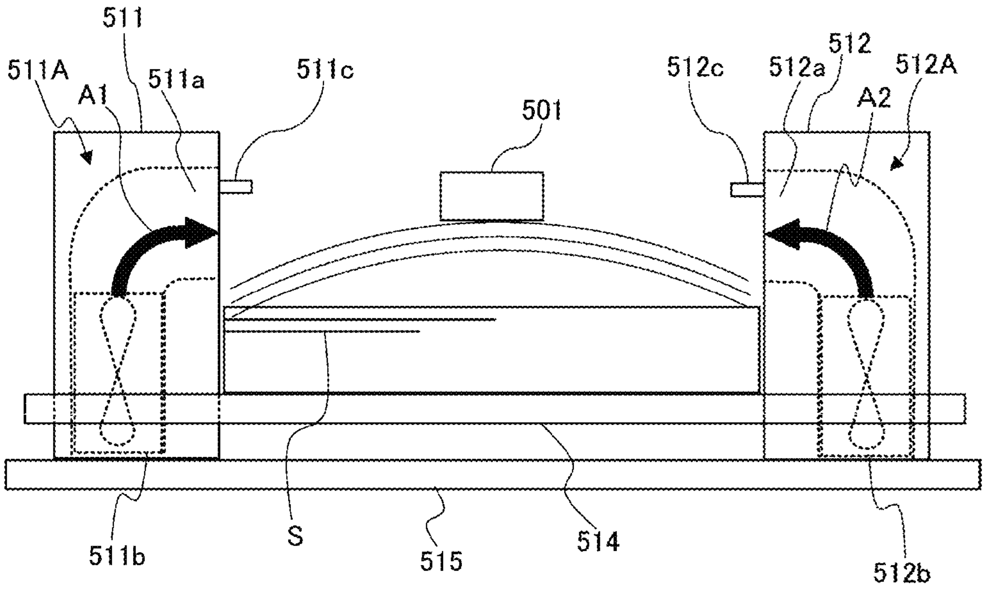
FIG. 3 is a diagram showing a side view of the configuration of the manual feeding apparatus according to the embodiment of the present invention.

As shown in FIGS. 2 and 3, the manual feeding apparatus 235 is provided with the manual feed tray 5 as a sheet accommodating portion and the manual sheet feeding portion 506 that feeds the sheets and separates the multi-conveyed sheets.

The manual sheet feeding portion 506 is provided with the pickup roller 501 as a feed roller that abuts on the upmost sheet of the sheet bundle and feeds the upmost sheet. Further, the manual sheet feeding portion 506 is provided with the feed roller 502 and the retard roller 503 as a separating portion that separates the sheets S fed from the pickup roller 501.

In the manual feeding apparatus 235, the drawing roller 504 is disposed downstream of the feed roller 502 in the sheet feeding direction. The drawing roller 504 is configured to draw the sheet S from the feed roller 502 and to feed the sheet S to the image forming apparatus main body 201 as shown in FIG. 1.

Further, between the feed roller 502 and the drawing roller 504 in the sheet feeding direction, namely, downstream of the manual sheet feeding portion 506 in the feeding direction, the feeding sensor 505 as a sheet detecting portion is disposed. The feeding sensor 505 is configured to detect the passing of the sheet S by outputting a signal depending on the presence/absence of the sheet S.

The manual feed tray 5 is provided with the manual feed tray base 515 and the lifting plate 514 as a sheet supporting portion that supports a bundle of accumulated sheets S. The lifting plate 514 is provided with the sheet detecting sensor 401 configured to detect the presence/absence of sheet S so that whether a bundle of sheets S is stacked on the lifting plate 514 or not can be judged. The position of the lifting plate 514 in the vertical direction is controlled by an elevating mechanism (not shown) in response to the accumulating amount of the sheets S.

Further, the manual feed tray 5 is provided with the side end restricting plates 511 and 512. The side end restricting plates 511 and 512 restrict the positions of the end portions (side ends) of the sheets S in the widthwise direction set on the lifting plate 514.

On the side end restricting plates 511, 512, the air blowing portions 511A and 512A are provided that respectively blows air to the accumulated sheets to loosen them as air blowing portions. The air blowing portion 511A of the side end restricting plate 511 is provided with the fan 511*b* driven by the fan motor 511M shown in FIG. 5 and the air blowing nozzle 511*a* that guides air blown by the fan 511*b* and blows air from the side of the sheet bundle as shown by the arrow A1 in FIG. 3. Likewise, the air blowing portion 512A of the side end restricting plate 512 is provided with the fan 512*b* driven by the fan motor 512M shown in FIG. 5 and the air blowing nozzle 512*a* that guides air blown by the fan 512*b* and blows air from the side of the sheet bundle as shown by the arrow A2 in FIG. 3. Further, the side end restricting plates 511 and 512 are respectively provided with the blown-up suppressing plates 511*c* and 512*c* in the vicinity of the air blowing nozzles 511*a* and 512*a* for preventing the sheets S to which air has been blown from be blown up and going over the side restricting plates 511 and 512.

Figure 4A:
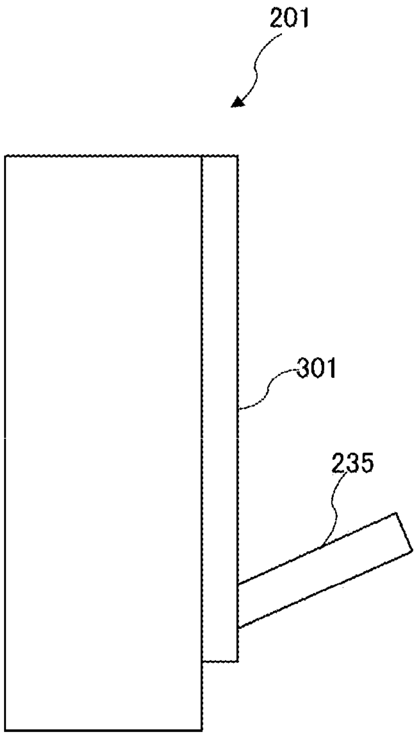
FIGS. 4A and 4B are schematic diagrams showing the states of manual feeding apparatus corresponding to the states of the right door according to the embodiment of the present invention.
Figure 4B:
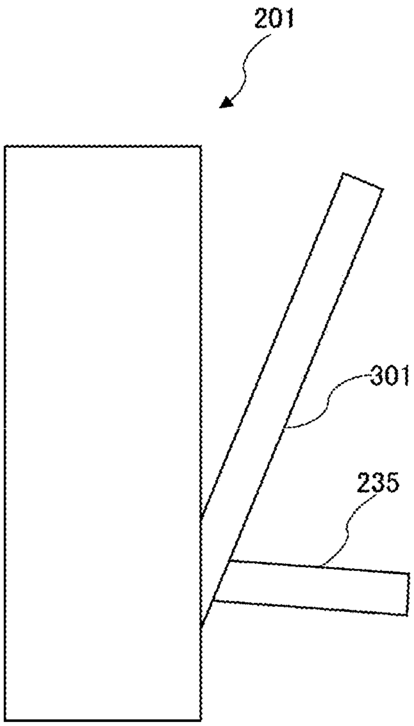

The right door 301 indicated by the broken line in FIG. 1 as a first opening and closing member can be opened in the right-under direction in FIG. 1. In the state where the right door 301 is closed, the right door 301 forms a sheet conveying path through which the sheets accommodated in the feeding cassette 1 or the manual feed tray 5 travel. In the state where the right door 301 is opened, the print job is halted and the sheet conveying path is exposed so that stagnating sheet in the sheet conveying path can be removed. For example, the right door 301 is provided with one roller of the registration roller pair 240 and the secondary transfer roller 217 so that when the right door 301 is opened, the nip portion of the registration roller pair 240 and the nip portion of the secondary transfer portion 201C can become respectively in the separated state. FIGS. 4A and 4B respectively indicate the states of the manual feeding apparatus 235 according to the right door 301 being opened or closed. As compared with the state indicated in FIG. 4A where the right door 301 is closed, in the state indicated in FIG. 4B where the right door 301 is opened, the angle of the manual feeding apparatus 235 is changed so that the posture of the stacked sheet is also changed. As a result, the adhesive force between the sheets may be produced again and it is necessary to perform the sheet loosening process again before feeding the sheet even after the sheet loosening process has been already completed.

The front door 302 indicated by the broken line in FIG. 1 as a second opening and closing member can be opened in the foreground in FIG. 1. In the state where the front door 302 is closed, the print job is halted. In contrast to the right door 301, even when the front door 302 is opened, the angle of the manual feeding apparatus 235 remains unchanged so that the posture of the sheet also remains unchanged. As a result, there is no change in the adhesive force between the sheets so that when the sheet loosening process has been completed, there is no need to perform the sheet loosening process again before feeding the sheets.

Figure 5:
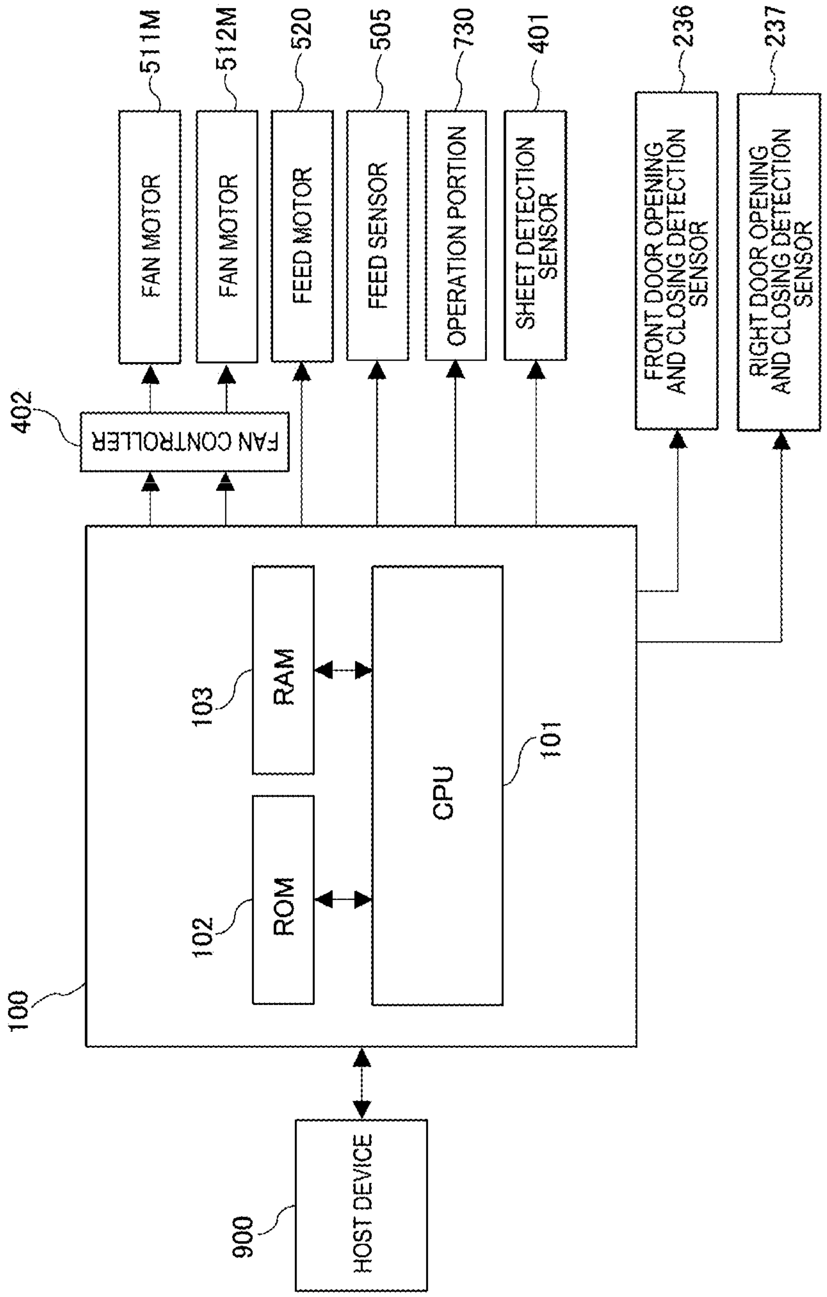
FIG. 5 is a circuit block diagram showing the control system of the image forming system according to the embodiment of the present invention.

Next, the configuration of the control system of the image forming system 600 will be described. FIG. 5 is a circuit block diagram showing the control system of the image forming system.

As shown in FIG. 5, the image forming apparatus 200 according to the present embodiment includes the controller 100 that has the CPU 101, the ROM 102, and the RAM 103. The controller 100 totally controls the image forming apparatus 200, the feeding deck 500 and the manual feeding apparatus 235. The controller 100 is connected to the host device 900 and the operation portion 730 and performs signal processing, sequence control for the various process devices while communicating with the host device 900 and the operation portion 730. The host device 900 is an external device such as a personal computer, an image scanner and a facsimile.

Further, the controller 100 is connected to the fan controller 402 that controls the driving of the above-described fan motors 511M and 512M, the feed motor 520 that drives the pickup roller 501, the feed sensor 505, the operation portion 730, the sheet detection sensor 401, the right door opening and closing detection sensor 237 as a first opening and closing detection portion and the front door opening and closing detection sensor 236 as a second opening and closing detection portion.

The fan controller 402 controls the driving of the fan motors 511M and 512M that respectively drive the fans 511*b* and 512*b* while performing a failure detection simultaneously. The failure judgement is performed by counting the number of revolutions of the fans 511*b* and 512*b* and by checking whether the number of revolutions reaches an intended one.

The front door opening and closing detection sensor 236 is provided in the front door 302 of the image forming apparatus main body 201 and detects the opening and closing of the front door 302. The right door opening and closing detection sensor 237 is provided in the right door 301 and detects the opening and closing of the right door 301. These sensors for detecting the opening and the closing of the doors have only to detect the opening and closing, so that these sensors can be configured by photosensors or microswitches.

The setting of the sheet information such as the sheet size, the sheet type, and the basis weight of the sheets set on the manual feed tray 6 will be described with reference to FIGS. 6A to 6D and 7.

Figure 6A:
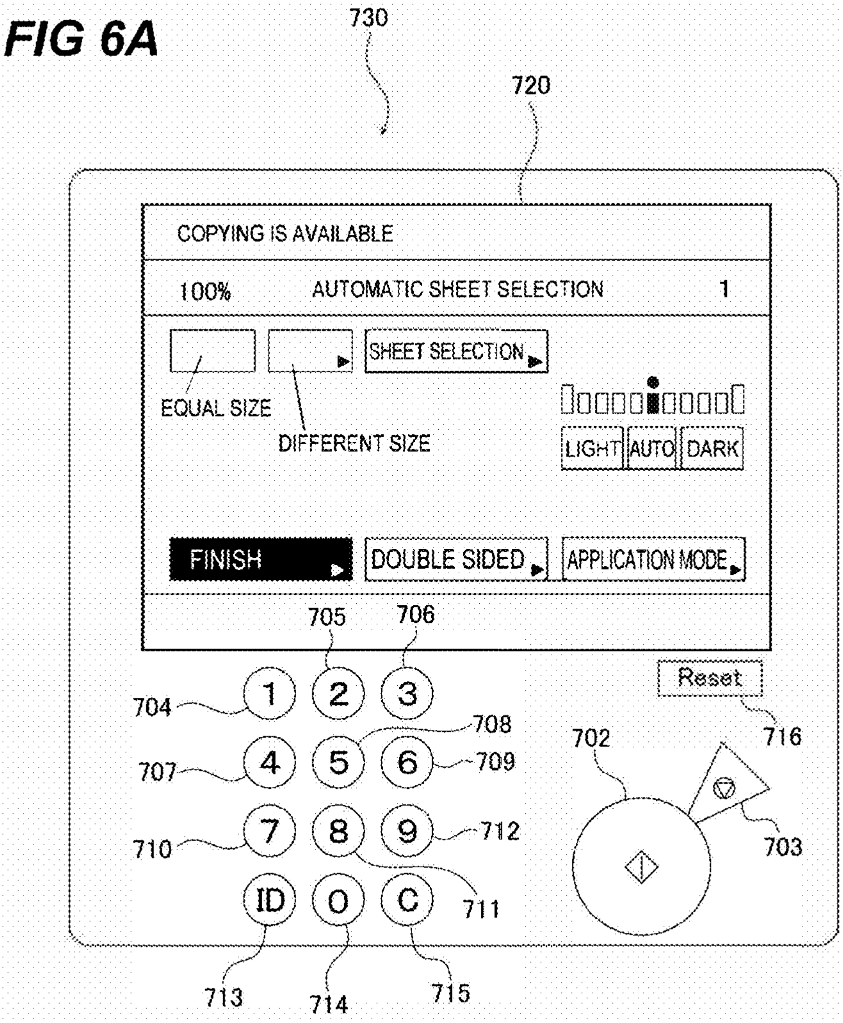
FIGS. 6A, 6B, 6C and 6D are diagrams showing the configuration of an operation portion of the image forming apparatus according to the embodiment of the present invention.

FIGS. 6A to 6D are diagrams showing the configuration of the operation portion 730 of the image forming apparatus of FIG. 1. As shown in FIG. 6A, the sheet type is set on the operation portion 730. As shown in FIG. 6A, on the operation portion 730, disposed are the start key 702 for starting the image forming operation, the stop key 703 for halting the image forming operation, the numeric keys 704 to 712, and 714 for inputting numbers, the ID key 713, the clear key 715 and the reset key 716. The display portion 720 with the touch panel is disposed at the upper portion and software keys can be displayed on it.

Figure 6B:
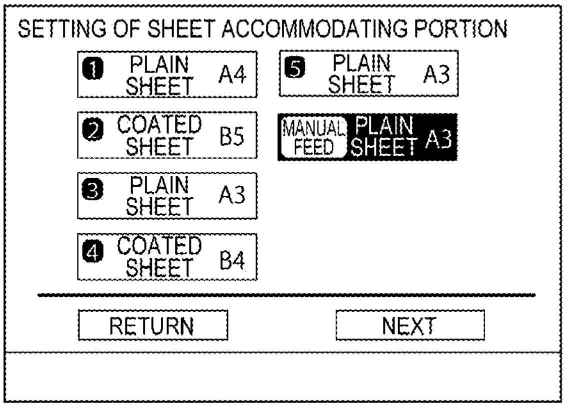
Figure 6C:
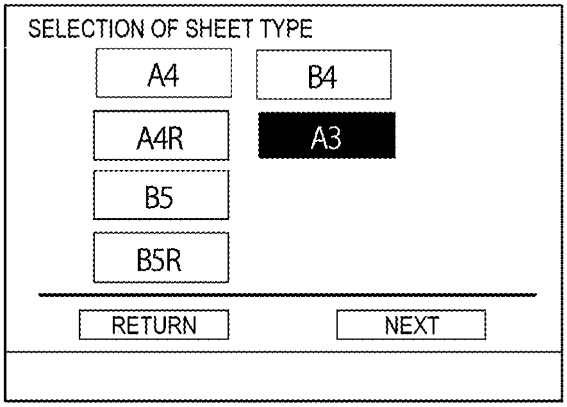
Figure 6D:
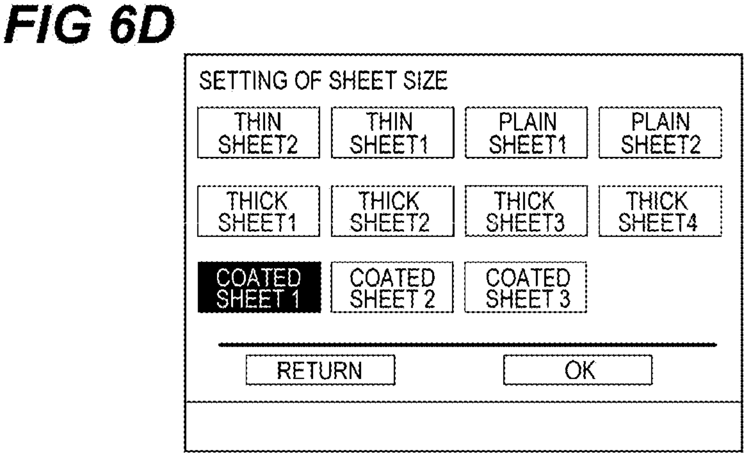

When a user pushes the sheet select button of the display portion 720 shown in FIG. 6A, the current display screen shifts to the feeding sheet cassette select screen shown in FIG. 6B by the CPU 101 shown in FIG. 5.

Figure 7:
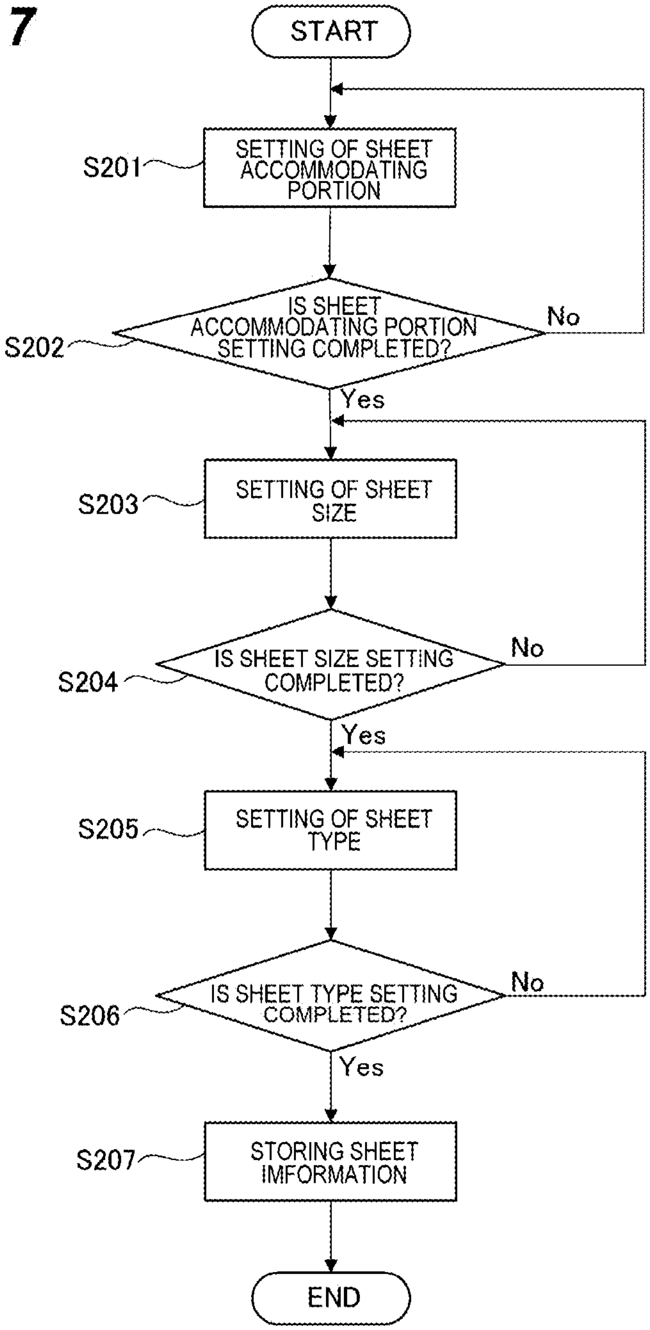
FIG. 7 is a flowchart of the CPU 101 in FIG. 5 showing the procedure of the operation portion in FIG. 6 according to the embodiment of the present invention.

First, the CPU 101 selects a sheet accommodating portion for performing the sheet setting according to the flowchart shown in FIG. 7 for the CPU 101 (step S201). When the manual feed tray is selected and the next button is pushed, the CPU 101 proceeds from the step S202 to the step S203 where the current display screen shifts to the sheet size select screen shown in FIG. 6C. When the A3 size of the sheets set on the manual feed tray is selected and the next button is pushed, the CPU 101 proceeds from the step S204 to the step S205 where the current display screen shifts to the setting screen for the basis weight and the sheet type shown in FIG. 6D. When the basis weight and the sheet type of the sheets set on the sheet accommodating portion are selected and the ok button is pushed, the CPU 101 proceeds from the step S206 to the step S207 where the sheet information is stored in the RAM 103 and the current display screen shifts to the initial screen shown in FIG. 6A to complete the sheet registration operation.

After the sheet information is set, when the start key 702 of the operation portion 730 is pushed, a print job starts and a sheet is fed from the selected sheet accommodating portion.

Note that it is not necessary to set the sheet information every time before the start of a print job. For example, after A3 sheets are set on the manual feed tray and a print job is performed, when a print job in which A3 plain sheets are fed from the manual feed tray should be performed again, it is sufficient to push the start key 702.

Figure 8:
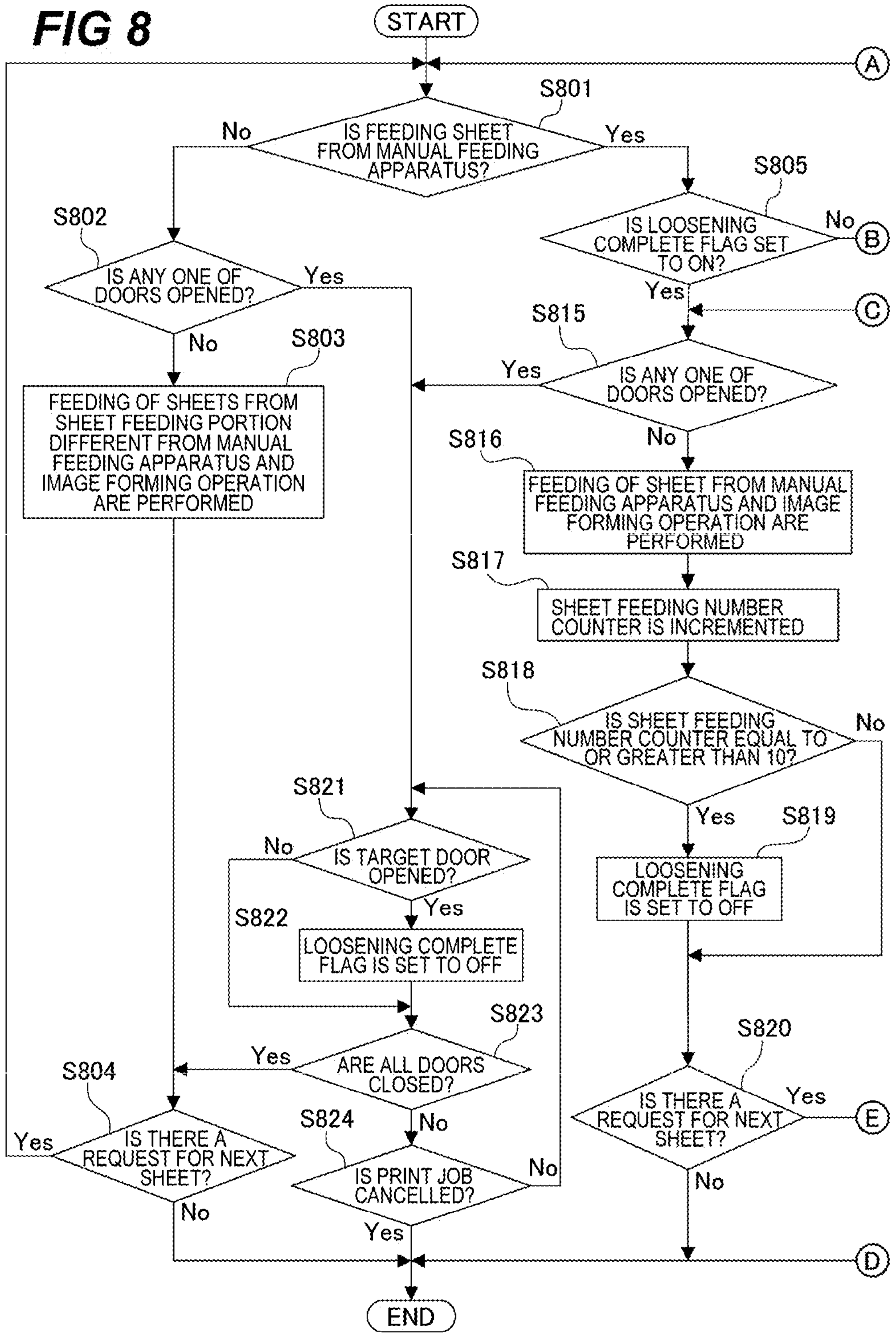
FIG. 8 is a flowchart of the CPU 101 in FIG. 5 for performing the sheet loosening operation control according to the embodiment of the present invention.
Figure 9:
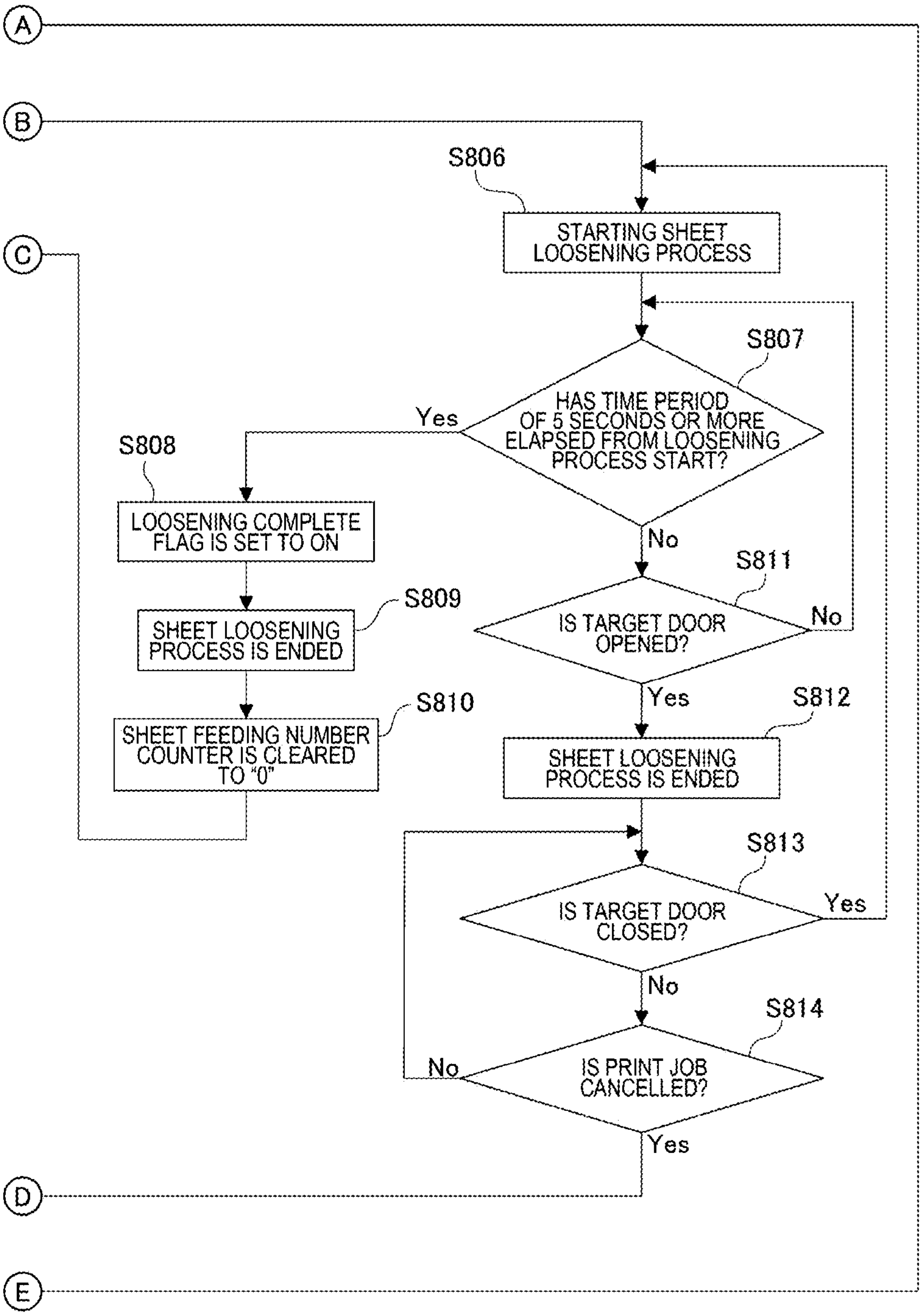
FIG. 9 is a flowchart of the CPU 101 in FIG. 5 for performing the sheet loosening operation control according to the embodiment of the present invention.
Figure 10:
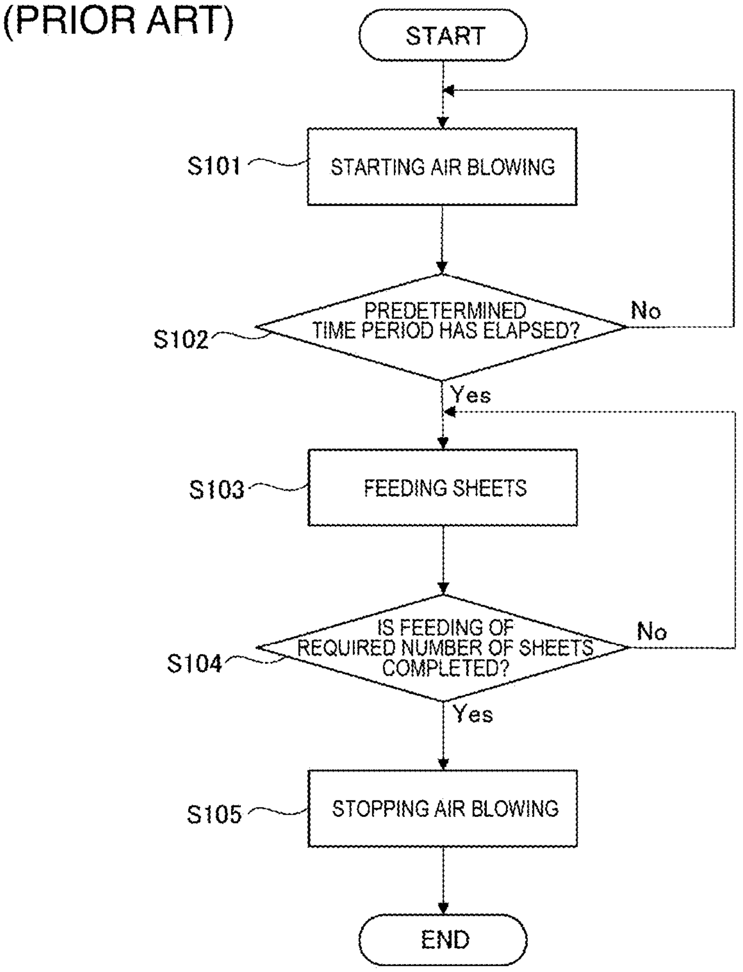
FIG 10 (PRIOR ART)
FIG. 10 is a flowchart showing a general sheet loosening operation control.

Next, the sheet loosening control of the present embodiment will be described with reference to the flowcharts of FIGS. 8 and 9 according to which the CPU 101 performs the steps. FIGS. 8 and 9 are a flowchart of the sheet loosening control and sheet feeding control.

When the start key 702 of the operation portion 730 is pushed to instruct a print job, the CPU 101 judges whether the next sheet should be fed from the manual feeding apparatus 235 (step S801). The CPU 101 receives the print job information from the host device 900 before the sequence shown in FIGS. 8 and 9 begins and stores it in the RAM 103. The print job information includes the feeding order and feeding destination.

When the next sheet should be fed from the manual feeding apparatus 235, the sequence proceeds to the step S805 and when the next sheet should be fed from another sheet feeding portion different from the manual feeding apparatus 235, the sequence proceeds to the step S802.

In the step S802, whether any one of the doors of the image forming apparatus main body 201 is opened is judged. In this judgement, the front door opening and closing detection sensor 236 and the right door opening and closing detection sensor 237 are used. When any one of the doors is opened, the sequence proceeds to the step S821 and when none of the doors are opened, the sequence proceeds to the step S803. Even when any one of the doors is opened, the print job is not cancelled until a cancel instruction is issued and the print job resumes after the all of the doors are closed.

In the step S803, the feeding of the sheets from a sheet feeding portion different from the manual feeding apparatus 235 and image forming operation are performed and the sequence proceeds to the step S804.

In the step S804, whether there is a request for the next sheet or not is judged. When there is a request for the next sheet, the sequence returns to the step S801 and when there is not such a request, the performance of the print job is completed.

When it is judged that the next sheet should be fed from the manual feeding apparatus 235 (step S801) and the sequence proceeds to the step S805, whether the loosening complete flag which indicates the necessity of the sheet loosening process is set to ON or not (step S805). The loosening complete flag is realized by a variable stored in the RAM 103. The ON of the loosening complete flag means that the loosening is completed and it is possible to immediately perform the sheet feeding from the manual feeding apparatus 235 and the OFF of the loosening complete flag means that the sheet loosening process is necessary before the sheet feeding. The initial value is set to OFF. When the loosening complete flag is ON, the sequence proceeds to the step S815 and when the loosening complete flag is OFF, the sequence proceeds to the step S806.

In the step S806, the sheet loosening process is started (the driving of fan motors 511M and 512M is started). When the sheet loosening process in which air is blown towards the sheets is performed, several to tens of sheets at the upper portion of the sheet bundle are loosened and blown up so that the adhesive force between the sheets decreases as shown in FIG. 3. The number of blown-up sheets depends on the positions of the blowing nozzles 511*a* and 512*a*, and the blown-up suppressing plates 511*c* and 512*c*. However, the number of sheets that are blown up for one air blowing operation is limited to several to tens. The blown-up sheets can be fed by the manual sheet feeding portion 506 without the risk of multi-feeding. When all of the blown-up sheets have been fed by the manual sheet feeding portion 506, it is necessary to perform the sheet loosening process again.

In the step S807, whether the present point of time is the one where the sheet loosening process should be ended is judged. The point of time where the sheet loosening process should be ended is defined as the point of time where the time period required for blowing air to reduce the adhesive force between sheets elapses. In the present embodiment, the time period is set to 5 seconds, however, the time period may be changed according to the predetermined size, sheet type, and basis weight of the sheet. When the present point of time is the one where the sheet loosening process should be ended, the sequence proceeds to the step S808 and when the present point of time is not the one where the sheet loosening process should be ended, the sequence proceeds to the step S811.

When it is judged that the present point of time is the one where the sheet loosening process should be ended, the loosening complete flag stored in the RAM 103 is set to ON (step S808), the sheet loosening process is ended (step S809), and the sequence proceeds to the step S810.

In the step S810, the sheet feeding number counter stored in the RAM 103 is cleared to "0". The sheet feeding number counter is realized by a variable for counting the number of sheets fed since the time when the loosening complete flag is set to ON. By counting the number of the fed sheets with the sheet feeding number counter and by comparing the number with the threshold value, the time for the next sheet loosening process is judged.

On the other hand, when it is judged that the present point of time is not the one where the sheet loosening process should be ended, the sequence proceeds to the step S811 where it is judged whether the target door is opened or not. The target door is defined as a door in which when the door is opened, the sheet loosening process should be stopped. In the present embodiment, the right door 301 is a target door. When the right door 301 is opened, the angle of manual feeding apparatus 235 is changed so that the sheet loosening process is not properly performed even if the sheet loosening process continues. Namely, the opening of the right door 301 affects the sheet loosening process. On the contrary, even when the front door 302 is opened, the angle of the manual feeding apparatus 235 is not changed so that the sheet loosening process can continue properly. Namely, the opening of the front door 302 does not affect the sheet loosening process. Therefore, the front door 302 is not a target door. The right door opening and closing detection sensor 237 is used for judging whether the target door is opened. When the target door is opened, the sequence proceeds to the step S812 where the sheet loosening process is stopped (fan motors 511M and 512M are stopped) and when the target door is not opened, the sequence returns to the step S807 where the sheet loosening process continues.

When the sheet loosening process is stopped in the step S812, the sequence proceeds to the step S813 where it is judged whether the target door is closed. The right door opening and closing detection sensor 237 is used for judging whether the target door is closed. When the target door is closed, the sequence returns to the step S806 where the sheet loosening process is performed again and when the target door is opened, the sequence proceeds to the step S814.

In the step S814, it is judged whether the print job is cancelled or not. The judgement of whether the print job is cancelled is performed according to whether the stop key 703 is pushed or not. When the print job is cancelled, the operation of the print job is stopped and when the print job is not cancelled, the sequence returns to the step S813 where it is judged whether the target is closed.

When the sheet loosening process is completed, the loosening complete flag is set to ON, and the sequence proceeds to the step of S815, whether any one of the doors is opened is judged similarly to the step S802. When any one of the doors is opened, the sequence proceeds to the step S821 and when all the doors are closed, the sequence proceeds to the step S816.

In the step S816, the feeding of the sheets from the manual feeding apparatus 235 and the image forming operation are performed and the sequence proceeds to the step S817.

In the step S817, the sheet feeding number counter stored in the RAM 103 is incremented and the sequence proceeds to the step S818.

In the step S818, whether the sheet feeding number counter reaches a threshold value (predetermined number) is judged. In the present embodiment, the threshold valued is set to 10. However, the threshold value may be changed according to the predetermined basis weight and sheet type of the sheets. When the sheet feeding number counter is equal to or greater than 10, the sequence proceeds to the step S819 and when the sheet feeding number counter is less than 10, the sequence proceeds to the step S820.

In the step S819, the loosening complete flag stored in the RAM 103 is set to OFF. By setting the loosening complete flag to OFF, the sheet loosening process can be performed when feeding the sheets from the manual feeding apparatus 235 next time.

In the step S820, whether there is a request for next sheet is judged. When there is a request for the next sheet, the sequence returns to the step S801 and when there is not a request for the next sheet, the operation of the print job is ended.

When the sequence proceeds from the step S815 to the step S821, it is judged whether the target door is opened. The target door is the same as the door judged in the step S811. The right door opening and closing detection sensor 237 is used for judging whether the target door is opened. When the target door is opened, the sequence proceeds to the step S822 and when the target door is not opened, the sequence proceeds to the step S823.

In the step S822, the loosening complete flag stored in the RAM 103 is set to OFF. By setting the loosening complete flag to OFF, the sheet loosening process can be performed when the target door is opened in the case of feeding sheets from the manual feeding apparatus 235 next time.

In the step S823, it is judged whether all of the doors are closed. The front door opening and closing detection sensor 236 and the right door opening and closing detection sensor 237 are used for judging whether all of the doors are closed. When all of the doors are closed, the sequence proceeds to the step S804 where the operation of the print job resumes. Conversely, when any one of the doors is opened, the sequence proceeds to the step S824.

In the step S824, whether the print job is cancelled is judged. When the print job is cancelled, the operation of the print job is ended and when the print job is not cancelled, the sequence returns to the step S821.

As described above, according to the sheet loosening process control of the present embodiment, the sheet loosening process is stopped when the door is opened during the sheet loosening process to affect the sheet loosening process. As a result, the consumption of wasteful electric power can be suppressed. Meanwhile, when the sheet loosening process is not affected, the sheet loosening process continues. As a result, the sheet loosening process is not necessary in the next sheet feeding to reduce the time period until the sheet feeding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-014648, filed Feb. 2, 2024, which is hereby incorporated by reference herein in its entirety

What is claimed is:

1. A sheet feeding apparatus comprising:

a sheet stacking member in which sheets are stacked;

an air blowing portion configured to blow air to the sheets stacked on the sheet stacking member;

a feeding portion configured to feed the sheets stacked on the sheet stacking member;

a conveying path through which the sheets fed by the feeding portion pass;

a first opening and closing member configured to be openable and closable in a closed position in which the first opening and closing member forms the conveying path through which the sheets pass and an opened position in which the first opening and closing member is opened for removing a sheet on the conveying path;

a first opening and closing detection portion configured to detect the closed position and the opened position of the first opening and closing member; and a controller configured to stop air blowing by the air blowing portion in response to a detection result of the first opening and closing detection portion in a state in which the air blowing portion is blowing air.

2. The sheet feeding apparatus according to claim 1, wherein when the first opening and closing detection portion detects a movement from the opened position to the closed position of the first opening and closing member, the controller resumes the blowing of air by the air blowing portion.

3. The sheet feeding apparatus according to claim 2, wherein the controller resumes the blowing of air by the air blowing portion based on an elapsed time period from a start of the blowing of air by the air blowing portion.

4. The sheet feeding apparatus according to claim 2, wherein when a predetermined time period has not elapsed since a start of the blowing of air by the air blowing portion and the first opening and closing detection portion detects the opened state, the controller resumes the blowing of air by the air blowing portion after the first opening and closing detection portion detects the closed position.

5. The sheet feeding apparatus according to claim 1, wherein the controller is configured to control the blowing of air by the air blowing portion based on a size and a type of the sheets stacked on the sheet stacking member.

6. The sheet feeding apparatus according to claim 1, wherein, in a state in which the opening and closing member is in the closed position, the air is being blown by the air blowing portion, and the first opening and closing detection portion detects the movement of the opening and closing member from the closed position to the open position, the controller stops the blowing of by the air blowing portion.

7. An image forming apparatus comprising:

an image forming portion configured to form an image on the sheets fed by the sheet feeding apparatus according to claim 1; and the sheet stacking member rotatably provided on a side surface of a main body of the image forming apparatus.

8. The image forming apparatus according to claim 7, further comprising:

a second opening and closing member provided on a front surface of the main body of the image forming apparatus in an openable and closable manner; and a second opening and closing detection portion configured to detect an opened position and a closed position of the second opening and closing member, wherein the first opening and closing member is provided on the side surface of the main body of the image forming apparatus.

9. The image forming apparatus according to claim 8, wherein:

when the first opening and closing detection portion detects the opened position of the first opening and closing member while the air blowing portion is blowing air, the controller stops the blowing of air by the air blowing portion, and when the second opening and closing detection portion detects the opened position of the second opening and closing member while the air blowing portion is blowing air, the controller does not stop the blowing of air by the air blowing portion.

* * * * *